United States Patent
Dederer et al.

(10) Patent No.: US 9,536,629 B2
(45) Date of Patent: Jan. 3, 2017

(54) PASSIVE POWER PRODUCTION DURING A NUCLEAR STATION BLACKOUT

(71) Applicant: Westinghouse Electric Company LLC, Cranberry Township, PA (US)

(72) Inventors: Jeffrey T. Dederer, Valencia, PA (US); Catherine M. Perego, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 536 days.

(21) Appl. No.: 13/764,804

(22) Filed: Feb. 12, 2013

(65) Prior Publication Data

US 2014/0029711 A1 Jan. 30, 2014

Related U.S. Application Data

(60) Provisional application No. 61/674,878, filed on Jul. 24, 2012.

(51) Int. Cl.
| | | |
|---|---|---|
| *G21C 15/18* | (2006.01) | |
| *G21D 3/06* | (2006.01) | |
| *G21C 15/26* | (2006.01) | |

(52) U.S. Cl.
CPC ............. *G21C 15/18* (2013.01); *G21C 15/26* (2013.01); *G21D 3/06* (2013.01); *Y02E 30/40* (2013.01)

(58) Field of Classification Search
CPC ......... G21C 15/00; G21C 15/12; G21C 15/18; G21C 9/00
USPC ....................................................... 376/299
See application file for complete search history.

(56) References Cited

U.S. PATENT DOCUMENTS

| | | | |
|---|---|---|---|
| 4,458,493 | A | 7/1984 | Amir et al. |
| 4,699,754 | A | 10/1987 | French |
| 5,202,083 | A | 4/1993 | Spinks et al. |
| 5,414,743 | A | 5/1995 | Batheja et al. |
| 5,431,016 | A | 7/1995 | Simpkin |

(Continued)

FOREIGN PATENT DOCUMENTS

| | | |
|---|---|---|
| JP | 2009115571 | 5/2009 |
| WO | WO2007024569 | 3/2007 |

OTHER PUBLICATIONS

Westinghouse Comprehensive Nuclear Training Operations: Nuclear Training Services. Thermal-Hydraulic Principles and Applications to the Pressurized Water Reactor II. 1982. pp. 7-24-7-26.*

(Continued)

*Primary Examiner* — Jack W Keith
*Assistant Examiner* — Lily C Garner
(74) *Attorney, Agent, or Firm* — Joseph C. Spadacene; Westinghouse Electric Company LLC

(57) ABSTRACT

Apparatus for passively generating electric power during a nuclear power station blackout by utilizing the temperature difference between the hot inlet of a residual heat removal circuit and the surrounding containment environment. A heat engine, such as a thermoelectric generator, a Stirling Cycle Engine or Rankine Cycle Engine, is coupled in heat exchange relationship with an uninsulated portion of the inlet to a passive residual heat removal heat exchanger and/or passive residual heat removal heat exchanger channel head to generate the power required to operate essential equipment needed to maintain the nuclear power station in a safe condition during a loss of normal onsite and offsite power.

6 Claims, 6 Drawing Sheets

(56) References Cited

U.S. PATENT DOCUMENTS

| | | | |
|---|---|---|---|
| 6,234,244 B1 | 5/2001 | Morrison et al. | |
| 8,933,317 B2* | 1/2015 | Moczygemba | H01L 35/32 |
| | | | 136/205 |
| 2005/0028858 A1 | 2/2005 | Rossi | |
| 2010/0124303 A1 | 5/2010 | Young et al. | |
| 2010/0260305 A1* | 10/2010 | Hyde | G21D 7/04 |
| | | | 376/299 |
| 2010/0260309 A1 | 10/2010 | Hyde et al. | |
| 2010/0266093 A1* | 10/2010 | Matsumoto | 376/372 |
| 2011/0200159 A1 | 8/2011 | Hyde et al. | |
| 2012/0155597 A1 | 6/2012 | Cook | |

OTHER PUBLICATIONS

International Search Report for PCT/US2013/049627 dated Dec. 17, 2013 (Form PCT/ISA/210).
Written Opinion of the International Searching Authority for PCT/US2013/049627 dated Dec. 17, 2013 (Form PCT/ISA/237).
Conway, Lawrence E., U.S. Appl. No. 13/444,932, filed Apr. 12, 2012, entitled "Passive Containment Air Cooling for Nuclear Power Plant," 15 pages.
International Preliminary Report on Patentability for PCT/US2013/049627 dated Feb. 5, 2015 (Forms PCT/IB/326, PCT/IB/373, PCT/ISA/237).
Westinghouse Electric Company LLC, EP 13822576.8 European Search Report, Feb. 12, 2016, 9 pages.

* cited by examiner

PASSIVE POWER PRODUCTION DURING A NUCLEAR STATION BLACKOUT

CROSS REFERENCE TO RELATED APPLICATION

This application claims priority under 35 U.S.C. §119(e) from Provisional Application Ser. No. 61/674,878, entitled "Passive Power Production During SBO With Thermo-Electric Generation," filed Jul. 24, 2012.

BACKGROUND

1. Field

This invention relates in general to nuclear power plants, and more particularly, to passively activated apparatus for providing auxiliary power to safety equipment in a nuclear power plant under emergency shutdown conditions where there is a loss of conventional onsite and offsite electrical power.

2. Related Art

A nuclear reactor, such as a pressurized water reactor, circulates coolant at high pressure through a cooling circuit traversing a reactor pressure vessel containing nuclear fuel for heating the coolant and a steam generator operable to extract energy from the coolant for useful work. A residual heat removal system is typically provided to remove decay heat from the pressure vessel during shutdown. In the event of a loss of coolant, means are provided for adding additional coolant to the system. A coolant loss may involve only a small quantity, whereby additional coolant can be injected from a relatively small high pressure makeup water supply, without depressurizing the reactor coolant circuit. If a major loss of coolant occurs, it is necessary to add coolant from a low pressure supply containing a large quantity of the coolant. Since it is difficult using pumps to overcome the substantial operating pressure of the reactor coolant circuit, e.g., 2250 psi or 150 bar, the reactor coolant circuit is depressurized in the event of a major loss of coolant so that coolant water can be added from an in-containment refueling water storage tank at the ambient pressure within the nuclear reactor system containment shell.

The primary circuit of an AP1000® nuclear reactor system 22 (shown in FIG. 1), offered by the Westinghouse Electric Company LLC, Cranberry Township, Pa., of which the present invention is a part, uses a staged pressure reduction system for depressurizing the primary coolant circuit, which is illustrated in FIGS. 1 and 2. A series of valves 72 couple the reactor outlet 56 (also known as the "hot leg" of the primary coolant circuit) to the inside of the containment shell 54 through spargers 74 in the in-containment refueling water storage tank 50, which vent and dissipate the energy of the hot leg coolant into the refueling water in the tank. When the tank heats up and emits steam, the steam is condensed on the inside of the containment shell. When initially commencing the depressurization, the coolant circuit 46 and the in-containment refueling water storage tank are coupled by the depressurization valves 72 through one or more small conduits 76 along the flow path with not insubstantial back pressure. As the pressure in the cooling circuit drops, additional conduits are opened by further actuation of the depressurization valves 72 in stages, each stage opening a larger and/or more direct flow path between the coolant circuit 46 and the containment shell 54.

The initial depressurization stages couple a pressurizer tank 80 which is connected by conduits to the coolant circuit hot leg 56 and to spargers 74 in an in-containment refueling water supply tank 50. The spargers 74 comprise conduits leading to small jet orifices submerged in the tank, thus providing back pressure and allowing water to condense from steam emitted by the spargers into the tank 50. The successive depressurization stages have progressively larger conduit inner diameters. A final stage has a large conduit 84 that couples the hot leg directly into the containment shell 54, for example, at a main coolant loop compartment 40 through which the hot leg 56 of the reactor circuit 46 passes. This arrangement reduces the pressure in the coolant circuit expeditiously, substantially to atmospheric pressure, without sudden hydraulic loading of the respective reactor conduits. When the pressure is sufficiently low, water is added to the coolant circuit by gravity flow from the in-containment refueling water storage tank 50.

Automatic depressurization in the AP1000® reactor system is a passive safeguard which ensures that the reactor core is cooled even in the case of a major loss of coolant accident such as a large breach in the reactor coolant circuit. Inasmuch as the in-containment refueling water storage tank drains by gravity, no pumps are required. Draining the water into the bottom of the containment building where the reactor vessel is located, develops a fluid pressure head of water in the containment sufficient to force water into the depressurized coolant circuit without relying on active elements such as pumps. Once the coolant circuit is at atmospheric pressure and the containment is flooded, water continues to be forced into the reactor vessel, where the boiling of the water cools the nuclear fuel. Water in the form of steam escaping from the reactor coolant circuit is condensed on the inside walls of the containment shell, and drained back into the in-containment refueling water storage tank to be injected again into the reactor coolant circuit.

The AP1000® nuclear power plant has been designed such that in the event of a station blackout, i.e., the total loss of traditional onsite and offsite power, the plant can safely shut itself down and achieve a safe shutdown condition using only passive systems. By traditional onsite and offsite power, we are referring to electric power conventionally generated from onsite and offsite sources. A few simple valves align the passive safety systems when they are automatically actuated. In most cases, these valves are "fail safe." They require power to stay in their normal, closed position. Loss of power causes them to open into their safe alignment. In all cases, their movement is made using stored energy from springs, compressed gas or batteries. The plant is designed to maintain this condition with no intervention for at least 72 hours after which some operator action is needed to extend the coping period. During the initial 72-hour period, battery banks are used to power any needed equipment and plant monitoring instrumentation, etc. It is desirable to explore additional passive means for extending this coping time beyond 72 hours by utilizing energy that is available within the plant at the time of and subsequent to shutdown.

Accordingly, it is an object of this invention to use the resources within the plant to safely maintain the plant beyond 72 hours without operator intervention or the assistance of offsite power.

It is a further object of this invention to so extend the coping period without altering the operation of existing plant systems.

SUMMARY

To achieve the foregoing objectives, this invention provides a nuclear power plant having a reactor with coolant circulating within a fissile nuclear core to carry heat generated within the core to a utilization circuit for creating useful work. The nuclear power plant includes a coolant residual heat removal circuit for dissipating residual heat generated in the core after the reactor has been shut down, especially in the unlikely event an abnormal operating condition is encountered. The residual heat removal circuit includes a residual heat removal conduit for conveying a volume of coolant from the reactor core through the residual heat removal circuit, wherein the residual heat removal conduit includes an uninsulated section. The residual heat removal circuit also includes a heat engine having a first component part in heat exchange relationship with the uninsulated section of the residual heat removal conduit and a second component part in heat exchange relationship with the environment surrounding the uninsulated section. The heat engine is responsive to a temperature difference between the residual heat removal conduit and the environment surrounding the uninsulated section to generate either electrical or mechanical power as an auxiliary power source to assist management of the abnormal operating condition. In one embodiment, the heat engine is a thermoelectric generator preferably fastened to an outer surface of the residual heat removal conduit with a heat conductive clamp. Desirably, the thermal electric generator is supported within a recess in the clamp; and preferably, the recess is in the outer surface of the clamp.

In another embodiment, the heat engine is either a Rankine Cycle Engine or a Sterling Cycle Engine. Preferably, the residual heat removal circuit includes a passive residual heat removal heat exchanger having a channel head and the uninsulated section is on a piping section leading to the channel head and/or on the channel head.

Typically, the nuclear power plant includes a heat removal and a monitoring system for managing a shutdown of the nuclear plant in the unlikely event of the abnormal operating condition. In accordance with another embodiment of this invention, one or more of the heat removal and the monitoring systems is at least in part operated by an onsite, independent, passively activated power source, wherein the auxiliary power source is connected to extend the operating life of the onsite independent, passively activated power source. Desirably, the auxiliary power source is only active when coolant flow has been initiated through the residual heat removal circuit.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
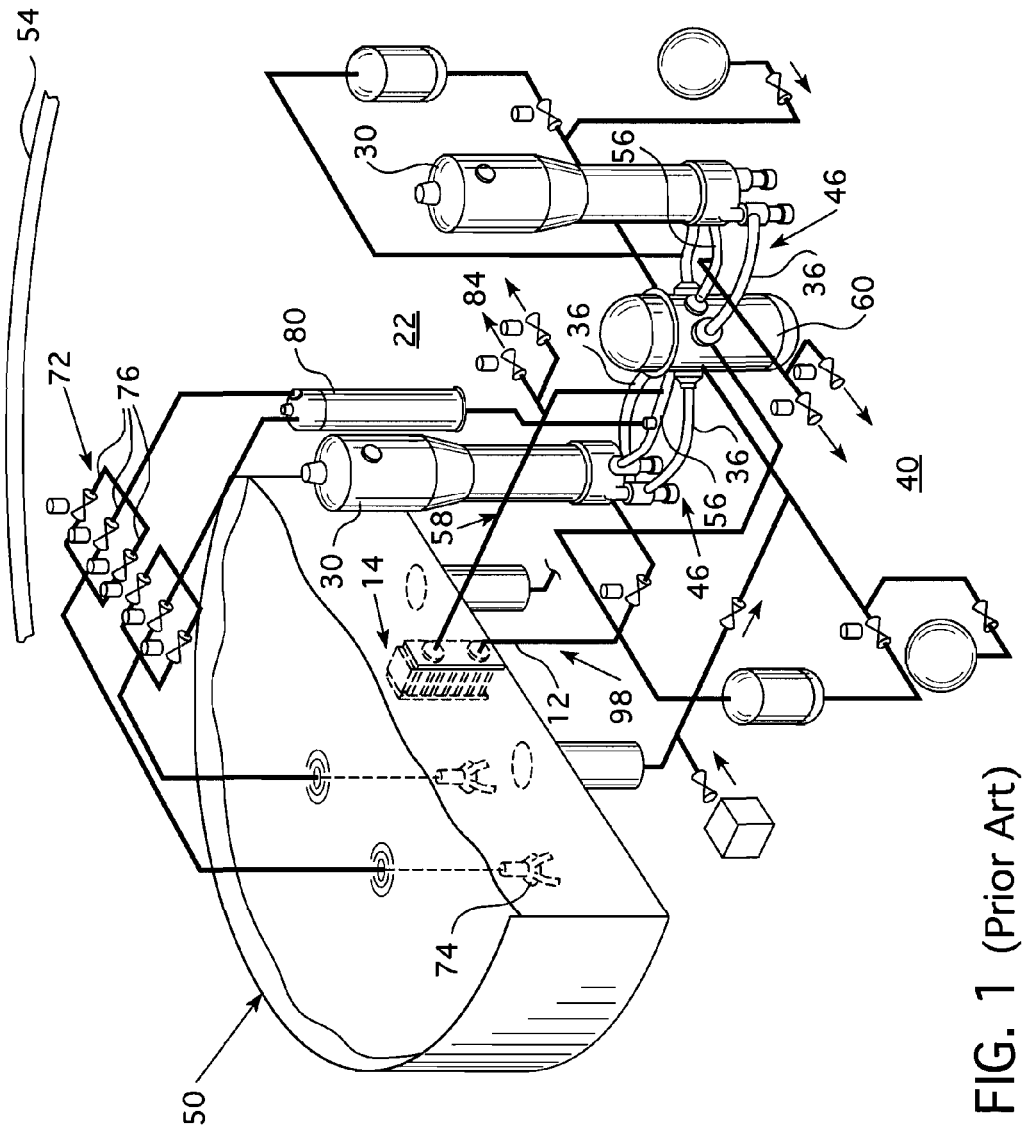
FIG. 1 is an isometric view of the major components of a passive core cooling system which can benefit from this invention.

From FIG. 1, it can be appreciated that the residual heat removal system 98 includes a conduit 58 connected to the hot leg of the reactor coolant piping 56 that is connected to the passive residual heat removal heat exchanger (PRHR) 14 which is immersed in the in-containment refueling water storage tank (IRWST) 50. The outlet PRHR heat exchanger piping 12 is connected to the channel head of a steam generator 30 and the coolant flow is then directed into the cold leg piping 36 where it is returned to the reactor vessel 60. When this passive cooling system is activated flow will occur through the aforementioned circuit under the action of natural circulation only, carrying hot reactor coolant into the PRHR heat exchanger where it can dissipate a portion of that energy to the water in the IRWST. The reduced temperature coolant is then returned to the reactor vessel. The difference in temperature between the coolant in the hot leg and the coolant in the cold leg results in a corresponding density difference which causes the flow to occur passively. A portion 13 of the PRHR inlet piping 58 (shown in FIG. 2) is intentionally left un-insulated. As a result, when hot coolant flows through piping 58, the pipe surface achieves a temperature close to the hot coolant temperature. In the subject invention, a heat engine 148 including, one embodiment an array of thermo-electric generators 10 (shown in FIGS. 2, 5 and 8) is attached to the outside surface of piping 58 and produces power by operating between the piping temperature and the ambient containment 54 temperature, i.e., a first component part 152 of the heat engine 148 is in heat exchange relationship with the uninsulated pipe section 13 and a second component part 154 is in heat exchange relationship with the environment surrounding the uninsulated section.

Figure 2:
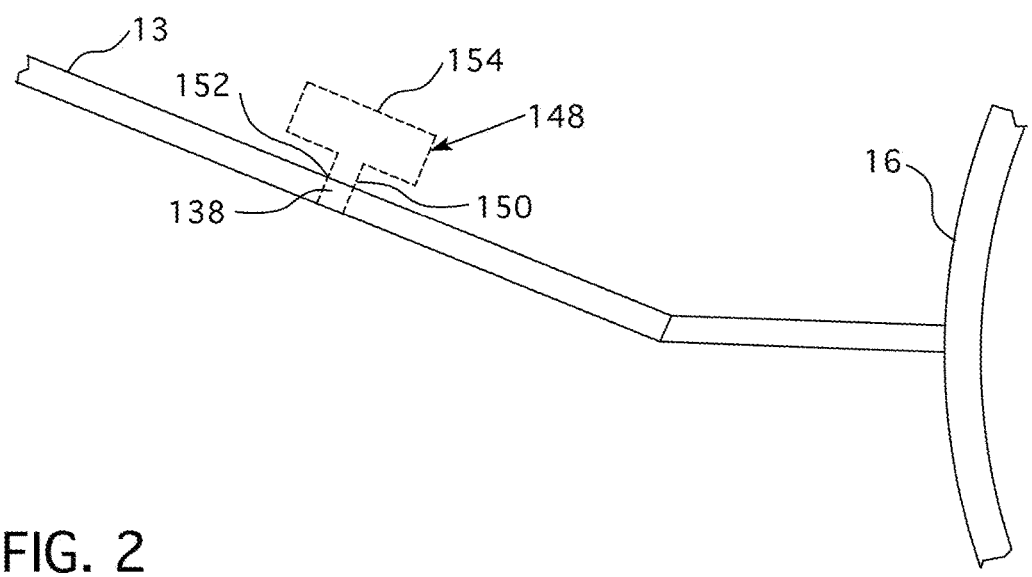
FIG. 2 is a schematic representation of an uninsulated portion of a section of the passive residual heat removal heat exchanger inlet piping with a heat engine attached thereto.
Figure 3:
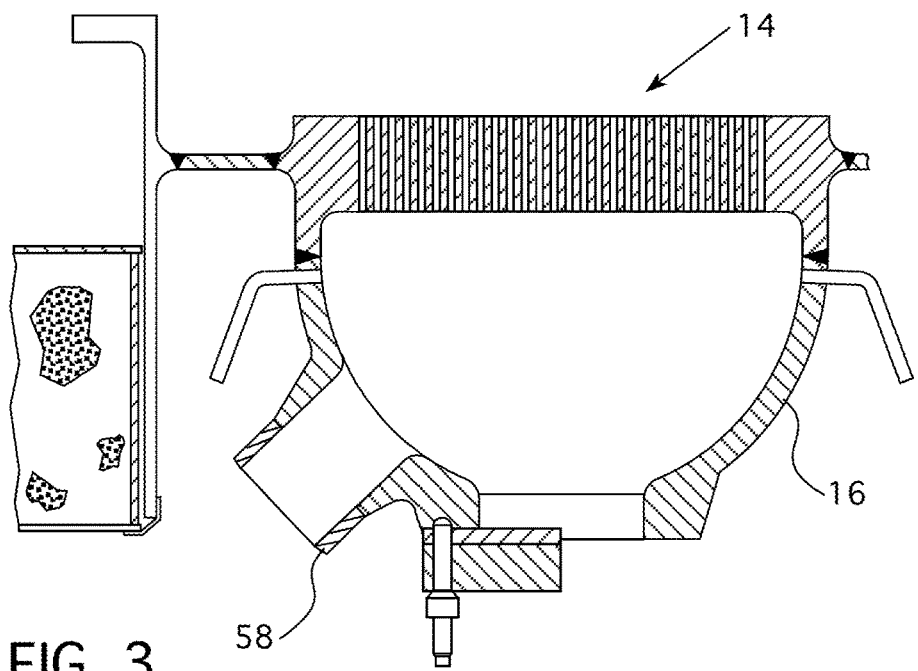
FIG. 3 is a cross section of a channel head of a passive residual heat removal heat exchanger.
Figure 4:
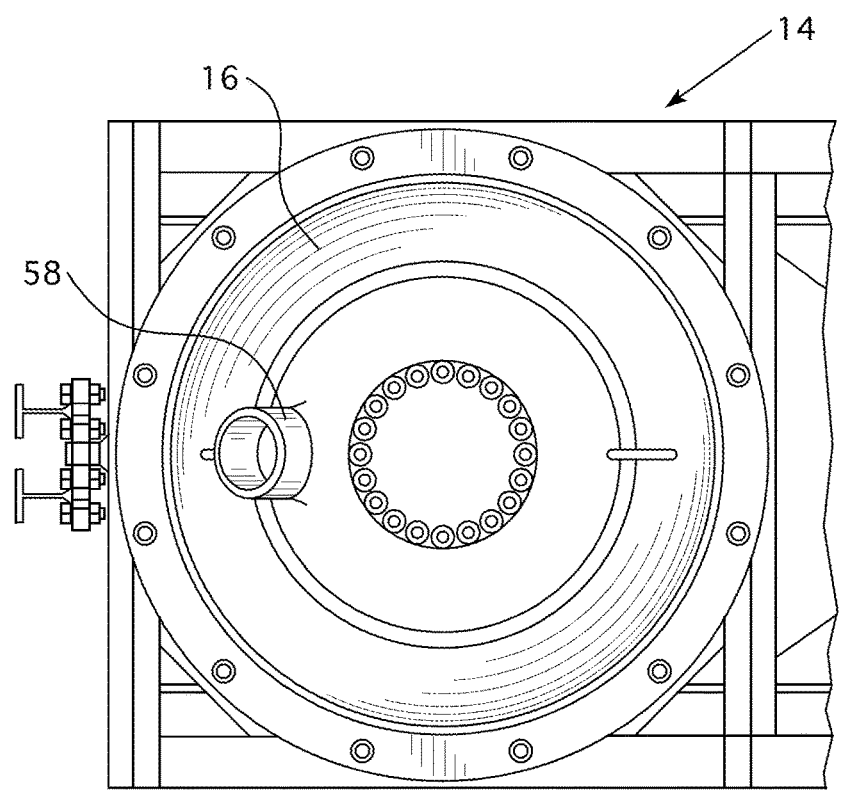
FIG. 4 is a plan view of the underside of the channel head of the passive residual heat removal heat exchanger shown in FIG. 3.

This invention turns the latent heat removed from the reactor as part of the passive residual heat removal system, into an auxiliary energy source that can be used to power many of the critical functions of the plant during a station blackout condition to maintain the plant in a safe state. In accordance with one embodiment of this invention, schematically illustrated in FIG. 2, thermoelectric generators are mounted on a portion of the piping 58 that is connected to the intake of the passive residual heat removal heat exchanger 14 which is located in the containment refueling water storage tank 50. The passive residual heat removal heat exchanger 14 is connected to the reactor coolant piping in such a way that core decayed heat removal can be accomplished by way of a natural circulation driven flow following a station blackout. A portion 13 of the piping 58 that is attached to the inlet channel head 16 of the passive residual heat removal heat exchanger 14 is intentionally left uninsulated (shown in FIG. 2 with the passive heat removal heat exchanger inlet nozzle, which is connected to the inlet pipe, shown as 58 in FIGS. 3 & 4. In addition, the surface of the channel head 16 itself is also uninsulated. Some of the available surface area of these components is shown in FIGS. 2, 3 and 4. When this heat exchanger 14 is placed into service during a station blackout, the uninsulated portion 13 of the inlet pipe 58 and the channel head 16 will be supplied with hot water from the reactor coolant system which will initially be at about 600° F. (316° C.), and remain at about 350° F. (177° C.) during the first 72-hour period. Thermoelectric generators are most efficient when they have a large temperature difference between the two sides of the thermoelectric generator (commonly referred to as the "hot side" and "cold side").

Figure 5:
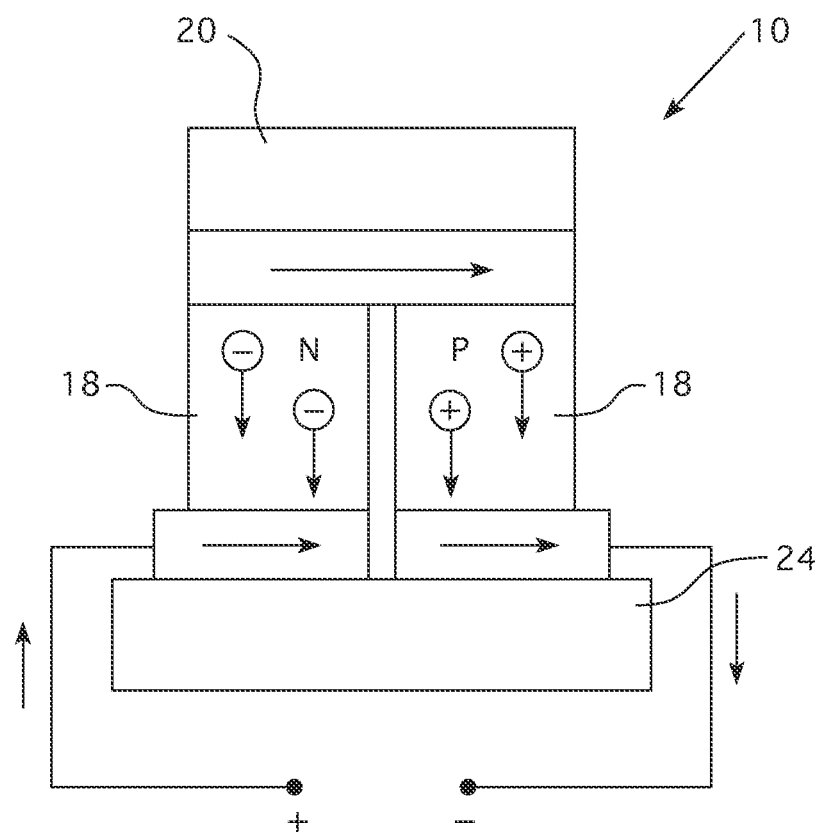
FIG. 5 is a schematic of a thermoelectric element that can be used as an auxiliary power source to operate the components employed to maintain the reactor system in a safe condition in the event of a station blackout.
Figure 6:
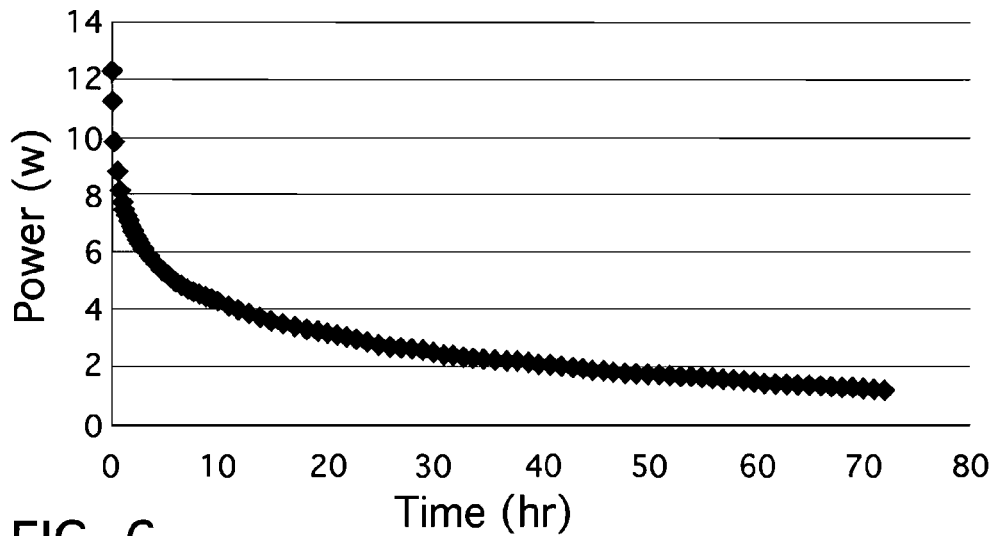
FIG. 6 is a graphical representation of a power versus time for one thermoelectric generator element.
Figure 7:
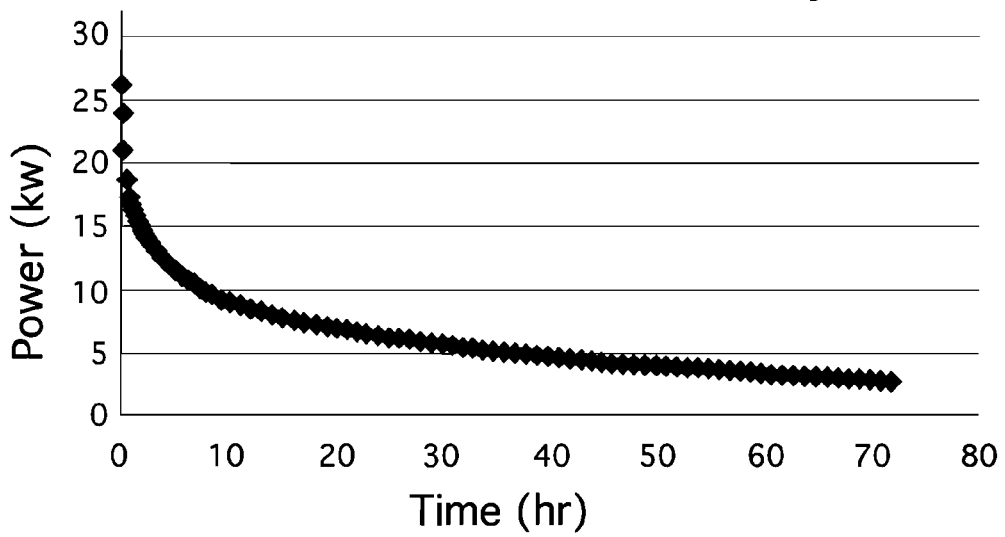
FIG. 7 is a graphical representation of the total power of the thermoelectric generator assembly.

An exemplary thermoelectric device is illustrated in FIG. 5 and is generally designated by reference character 10. The thermoelectric device 10 generally consists of two or more elements of N and P-type doped semiconductor material 18 that are connected electrically in series and thermally in parallel. The N-type material is doped so that it will have an excess of electrons (more electrons than needed to complete a perfect molecular lattice structure) and the P-type material is doped so that it will have a deficiency of electrons (fewer electrons than are necessary to complete a perfect lattice structure). The extra electrons in the N material and the "holes" resulting from the deficiency of electrons in the P material are the carriers which move the heat energy from a heat source 20 through the thermoelectric material to a heat sink 24 which, in this case, is the environment surrounding the passive residual heat removal piping and/or channel head on which the thermoelectric generator is mounted. The electricity that is generated by a thermoelectric module, which may comprise one or more series or parallel connected thermoelectric elements, such as the element illustrated in FIG. 5, is proportional to the magnitude of the temperature difference between each side of the element 10. An array of thermoelectric generators are mounted on the passive residual heat removal system piping 58 or channel head 16 would experience a large delta temperature between the hot pipe surface and the ambient temperature within the containment and have the capability to generate significant power. FIG. 6 shows the typical power output of a single thermoelectric generator element as a function of time (since the hot temperature decays with time), and FIG. 7 shows the total power produced if all the available surface area of the pipe and the channel head is utilized. Full utilization of the available area in an AP1000® nuclear plant design will accommodate 2,130 thermoelectric generator panels. As can be seen, the total power produced is significant, starting out at over 25 kilowatts and remaining above 5 kilowatts for at least the first 24 hours. This power can be used to recharge batteries or directly power equipment as needed. This is of value to the utility operators of a nuclear plant, because this passively generated power can be used to extend the coping period for the plant by reducing the demand on the existing banks of batteries.

Figure 8:
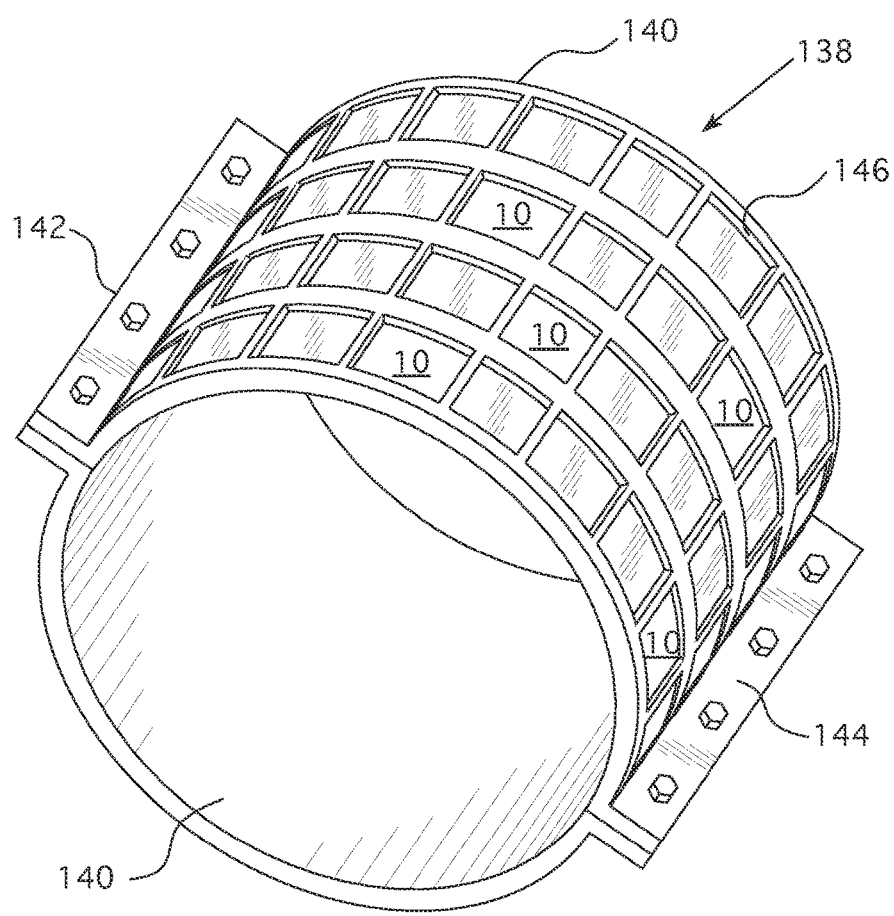
FIG. 8 is a perspective view of a mounting clamp for installing the thermoelectric generator elements onto a circular pipe section.

Typically, the most efficient commercially available thermoelectric generators are manufactured as relatively small (2-3 inch (5.1-7-6 cm) square) panels. However, these square panels do not fit well around the circumference of a pipe. One way to solve this problem is to utilize a clamp that would fit around the pipe or extend around the circular section of the passive residual heat removal heat exchanger, i.e., the upper channel head in the area of the tube sheet. Such a clamp 138 is shown in FIGS. 2 and 8. The clamp comprises two semi-circular sections 140 which meet around the pipe at each end of the semi-circular sections and are coupled together by matching attachment flanges 142 at one end and at the other end by attachment flanges 144 that can be bolted together. Alternatively, the flanges 142 can be replaced by a hinge. The clamp 138 is constructed from a highly thermally conductive material such as an aluminum alloy, and has machined or cast recesses 146 around the circumference that the thermoelectric generator squares fit into and have good thermal contact with. These clamps would maximize the surface area of the hot side, allowing for the most power generation. Each of the thermoelectric generators may be connected to the others in an array, and the arrays can be connected in series, parallel, or a mix of both, to produce the voltage and current levels needed. The clamp 138, as an alternative to the mating bolted flanges shown in FIG. 8, can be made as a clam shell design to facilitate attachment to existing piping by incorporating a hinge joint in place of the bolted flange 142 at one end of the semi-circular sections and a bolted flange 144 opposite the hinge, or two bolted flanges respectively located on opposite sides of the clamp as shown in FIG. 8. This mounting concept can be extended to any curved surface including the passive residual heat removal heat exchanger channel head 16, with attachment points used as needed to secure the thermoelectric generator mounting hardware to the surface.

Alternatively, a Stirling Cycle Engine or a Rankine Cycle Engine can be connected in heat exchange relationship with the piping 58 and/or channel head 16 to convert the delta temperature difference between those surfaces and the surrounding environment into mechanical power which can be used to directly drive pumps or drive a generator to create the auxiliary electric power that may be needed to operate valves and instrumentation. Such an alternate arrangement is figuratively illustrated in FIG. 2 with the block 148 representing either the Rankine Cycle or the Stirling Cycle Engine in heat communication with the piping 58 through a heat pipe 150.

Accordingly, the embodiments described herein provide a true passive means for generating power for a nuclear plant from an independent source separate from the nuclear station's conventional source of power, following a station blackout. The heat engines, i.e., the thermoelectric generators or the Rankine Cycle or the Stirling Cycle Engines, are inactive under normal conditions since the piping and/or channel head that they are attached to are cold, but activate automatically when hot fluid passes through the pipe, as is the case when natural circulation driven flow starts. These devices can also be provided with protective coatings that enable them to operate in a steam environment which may be present inside the containment as the in-containment refueling water storage tank water boils off.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:
1. A nuclear power plant having a reactor with a coolant circulating within a fissile nuclear core to carry heat generated within the core to a utilization circuit for creating useful work, including;
   a coolant residual heat removal circuit for dissipating residual heat generated in the core after the reactor has been shut down in the unlikely event an abnormal operating condition is encountered, the coolant residual heat removal circuit including:
      a residual heat removal conduit for conveying a volume of a coolant from the reactor core through the residual heat removal circuit, wherein the residual heat removal conduit includes an uninsulated section;

a plurality of heat engines respectively having a first component part in heat exchange relationship with the uninsulated section and a second component part spaced from the uninsulated section and in heat exchange relationship with the environment surrounding the uninsulated section and responsive to a temperature difference between the residual heat removal conduit and the environment surrounding the uninsulated section to generate either electrical or mechanical power as an auxiliary power source to assist management of the abnormal operating condition; and a heat conductive clamp having a plurality of recesses in an outer surface of the clamp with at least some of the recesses respectively fastening at least a portion of the first component part of a corresponding one of the plurality of heat engines in substantially close proximity to an outer surface of the uninsulated section.

2. The nuclear power plant of claim 1 wherein the heat engine is a thermoelectric generator.

3. The nuclear power plant of claim 1 wherein the heat engine is either a Rankine cycle engine or a Stirling cycle engine.

4. The nuclear power plant of claim 1 wherein the residual heat removal circuit includes a Passive Residual Heat Removal heat exchanger having a channel head and the uninsulated section is on a piping section leading to the channel head and/or on the channel head.

5. The nuclear power plant of claim 1 including a heat removal and a monitoring system for managing a shutdown of the nuclear plant in the unlikely event of the abnormal operating condition wherein one or more of the heat removal and the monitoring systems is at least in part operated by an onsite, independent, passively activated power source wherein the auxiliary power source is connected to and extends the operating life of the onsite, independent, passively activated power source.

6. The nuclear power plant of claim 1 wherein the auxiliary power source is only active when coolant flow has been initiated through the residual heat removal circuit.

* * * * *